Feb. 21, 1950 — J. H. FISHBACK — 2,498,075
HAND TOOL FOR BREAKING LOOSE TIRE CASINGS FROM ITS RIM
Filed Feb. 14, 1946
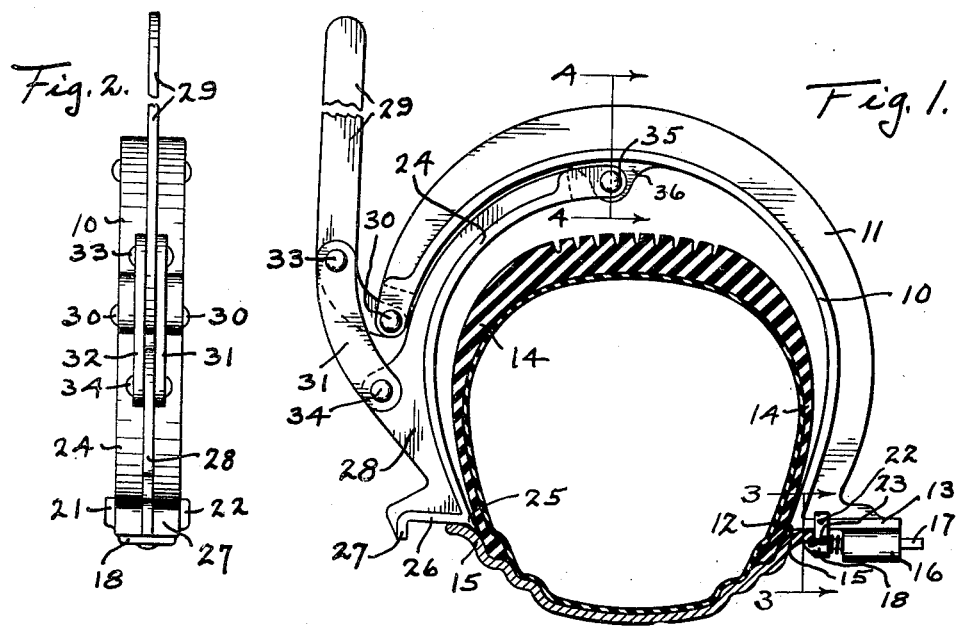
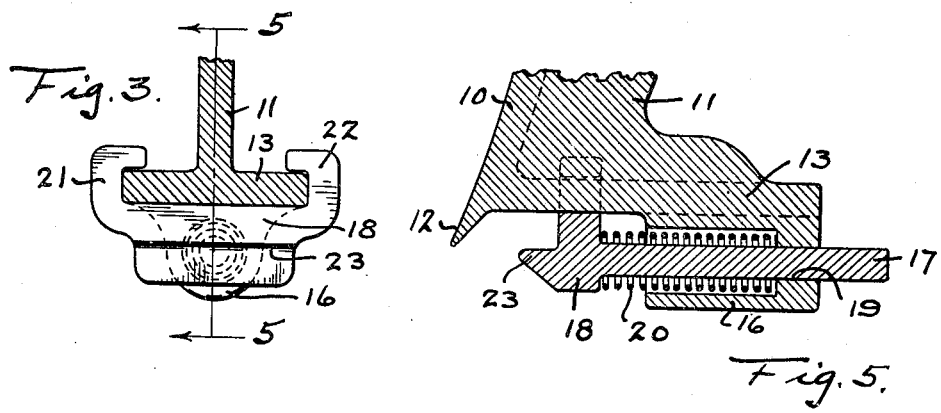
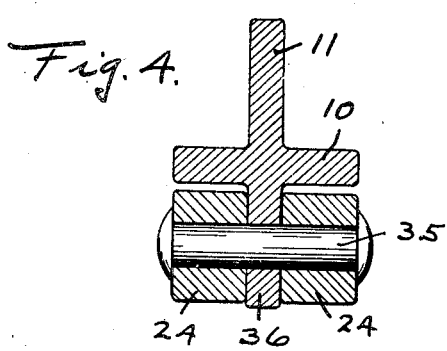
INVENTOR,
JOHN H. FISHBACK,
By Herbert A. Minturn,
ATTORNEY.

Patented Feb. 21, 1950

2,498,075

UNITED STATES PATENT OFFICE 2,498,075

HAND TOOL FOR BREAKING LOOSE TIRE CASING FROM ITS RIM

John H. Fishback, Noblesville, Ind.

Application February 14, 1946, Serial No. 647,497

1 Claim. (Cl. 157—1.28)

This invention relates to a tool for breaking loose tire casings from a tire rim and has for primary object the provision of a structure which will serve to break both beads of the casing from the rim in one setting of the tool. Usually a tire casing will adhere firmly to the upwardly extending portions of a tire rim and resist attempts to insert a tire removing iron between the bead and the rim. I am aware of the fact that tire tools have heretofore been employed which will break one bead at a time loose from the rim, following which operation the tool has to be removed and reversed in position over the casing in order to break the other bead loose.

My invention provides an extremely simple device which actually will break loose both beads of the casing upon one operation of the tool lever, all in a manner positively retaining the side of the tool in engagement with the tire rim opposite from that side of the tool on which the operating lever is positioned to be rocked downwardly, otherwise tending to lift that opposite side away from the rim and away from the bead on that side of the casing.

Further objects and advantages of the invention will become apparent to those versed in the art in the following description of one particular form of the invention, as illustrated in the accompanying drawing, in which:

Fig. 1 is a view in side elevation of a structure embodying the invention and as applied to a tire casing preliminary to the breaking loose operation;

Fig. 2, a view in end elevation;

Fig. 3, a view in section on an enlarged scale on a line 3—3 in Fig. 1;

Fig. 4, a view in section on a line 4—4 in Fig. 1;

Fig. 5, a view in section on a line 5—5 in Fig. 3.

Like characters of reference indicate like parts throughout the several views in the drawing.

I form a primary jaw member 10 having an inner surface and contour generally circular and preferably reinforced by an outwardly extending rib 11. On the lower end of this jaw 10 is a wedge-shaped end 12. Spaced upwardly from the lower end of this end 12 is an out-turned foot 13. The length of this end portion 12 below the underside of the foot 13 is made to be such that the portion 12 may be forcibly entered between the tire casing 14 and the upwardly turned portion of the rim 15 to substantially seat the underside of the foot 13 on the top outwardly flared portion of the rim 15.

The foot 13 is provided with a downwardly extending barrel 16 through which is passed the stem 17 of a head 18. The outer end of this barrel 16 is provided with a bore 19 through which the stem 17 slidingly engages. The main length of the bore through the barrel 16 however is of a larger diameter permitting the reception therein of a spring 20 normally urging the head 10 toward the jaw end 12 as best illustrated in Fig. 5, wherein the spring 20 is shown in a slightly compressed position. The head 18 is provided with upwardly turned arms 21 and 22 which are turned over and on top of portions of the foot 13 to serve as guiding and retention members. A jaw 23 extends horizontally from the head 18 in the direction of the jaws end portion 12 and has its top side spaced below the foot 13 a sufficient distance to permit the jaw to enter under or over the outwardly flared end of the tire rim 15 as best indicated in Fig. 1. The spring 20 normally urges the head 18 against the outer edge of the rim 15 to retain the jaw 23 thereunder.

Hinged to the underside of the jaw 10, approximately in the central, circumferential plane through the casing 14, by a pin 35 extending through a jaw lug 36, is a second jaw 24 which is carried around under the jaw 10 and continued downwardly therefrom to have a generally wedge-shaped end 25 substantially the same shape as that of the end 12. Extending substantially horizontally from this end portion 25 (with the parts positioned as indicated in Fig. 1) is a foot 26 spaced upwardly along the jaw 24 a short distance above the extreme end of the portion 25. The length of this portion 25 which extends below the underside of the foot 26 is made to be such that it will fit freely between the wedge-shaped normal opening between the side wall of the casing 14 and the inner face of the upwardly and outwardly turned part of the rim 15 adjacent thereto. This foot 26 is carried outwardly from the end portion 25 a short distance, substantially an inch and one-quarter (1¼") being sufficient, and then turns downwardly by a foot 27. The jaw 24 is reinforced against bending by the outwardly extending rib 28.

An operating lever 29 has a lower curved end, the end of which is pivotly engaged through the pin 30 to the end of the jaw 10 which is extended over the jaw 24. The lever 29 is also linked to the jaw 24 by any suitable means, herein shown as by two side plates 31 and 32, applied on respective sides of the lever 29 and of the rib 28. The upper ends of these plates 31 and 32 are connected to the lever 29 by a pin 33 at a distance spaced from the pin 30 sufficiently to have the lever 29 substantially vertically positioned when the rib 28 of the jaw 29 contacts the inner face of the jaw 10 with all of the parts positioned as indicated in Fig. 1. This spacing of course may vary to allow the lever 29 to approach the rib 11 more closely than is indicated by the drawing. The lower ends of the plates 31 and 32 are connected to an outwardly extended portion of the rib 28 by means of the pin 34.

To operate the tool, the end portion 12 of the jaw 10 is brought around toward the right hand side of the casing 14 as viewed in Fig. 1, in such manner that the jaw 23 is positioned to the right and allowed to drop back against the rim 15 to engage thereunder to a slight degree at least and the jaw 10 is rocked around and downwardly to the left to bring the end 12 down between the casing 14 and rim 15. The end 25 of the jaw 24 is brought up against the sidewall of the casing 14 on its left hand side over the left hand edge of the rim 15 and the lever 29 is rocked in a counter-clockwise direction which will tend to force the end 25 down along the casing wall until the foot 26 seats on the upper edge of the rim 15 as indicated in Fig. 1. Continued rocking of the lever 29 has a tendency to lift the end portion 12 of the jaw 10 from the rim 15, but by reason of the engagement of the jaw 23 with the rim, that action is prevented. As the lever 29 is continued to be pulled to the left and downwardly, the jaw 24 is rocked inwardly to push the left hand bead away from the upturned portion of the rim 15. The travel of the bead from the rim 15 is limited by the spacing of the downturned foot 27 from the end 25. Upon engagement of the foot 27 with the outer edge of the rim 15, the end 12 of the jaw 10 will start to travel inwardly to cause a spring 20 to be compressed while the jaw 23 engagement with the ring 15 is maintained. This inward travel of the jaw end 12 will break loose the right hand bead of the casing 14. Generally the right hand bead will have broken loose before the left hand bead breaks loose and allows the foot 27 to strike the ring 15, although in many cases the left hand bead will first be pushed in before the right hand bead breaks loose.

Thus it is to be seen that the end 12 of the jaw 10 contrary to action of tools heretofore employed is prevented from traveling up and around the sidewall of the casing 14 rendering it unusable for breaking the bead loose on that side. This action is that normally encountered in such heretofore used tools by reason of the fact that the lever 29 is pulled to the left to squeeze the two jaw ends one toward the other and this sets up the normal tendency to rock the end 12 away from the rim 15.

However as indicated, by reason of the presence of the engaging jaw 23, that action is prevented and both beads of the casing are broken loose from the rim 15 in the one setting of the tool.

While I have shown and described my invention in the one particular form, it is obvious that structural differences may be employed without departing from the spirit of the invention, particularly in the shapes of the jaws and the leverage system, all without departing from the spirit of the invention, and I therefore do not desire to be limited to that precise form beyond the limitations necessarily imposed by the following claim.

I claim:

In a tire tool for breaking a tire casing loose from a rim, an arcuate jaw formed to reach from an edge of the rim around over the casing and terminate intermediate the tread of the casing and the edge of the rim opposite said first edge; a second jaw hinged to said first jaw intermediate its ends and extending under and beyond said first jaw around and down to said opposite rim edge; a lever having one end hinged to the overlying end of said first jaw; a link hingedly connected by one end to said second jaw intermediate the ends thereof and by its other end to said lever; a spring urged latch bar carried on said first jaw at said first rim edge end, said latch bar formed to abut said first rim edge with a portion extending under that edge to prevent lifting of said first jaw therefrom; and said second jaw having a foot to bear on said opposite rim edge; and a downturned foot spaced outwardly a distance on said foot to abut the said opposite rim edge following a predetermined inward travel of the first foot.

JOHN H. FISHBACK.

REFERENCES CITED

The following references are of record in the file of this patent:

UNITED STATES PATENTS

| Number | Name | Date |
| --- | --- | --- |
| 1,066,210 | Mahon | July 1, 1913 |
| 1,414,908 | Wafer | May 2, 1922 |
| 1,604,306 | Porterfield | Oct. 26, 1926 |
| 1,616,362 | Gagnon | Feb. 1, 1927 |
| 1,776,804 | Blaeser | Sept. 30, 1930 |
| 2,009,338 | Brown | July 23, 1935 |
| 2,212,768 | Bonneau | Aug. 27, 1940 |
| 2,333,880 | Ohlsen | Nov. 9, 1943 |
| 2,439,135 | Johnson et al. | Apr. 6, 1948 |

FOREIGN PATENTS

| Number | Country | Date |
| --- | --- | --- |
| 157,716 | Great Britain | Oct. 6, 1921 |